United States Patent Office 3,613,363
Patented Oct. 19, 1971

3,613,363
SYSTEM FOR PROTECTING GAS TURBINE ENGINE OF A POWER PLANT WHILE THE ENGINE IS RUNNING DOWN
Albert Jubb, Kenilworth, and Stanley Hutchinson and Richard H. Webb, Mickleover, England, assignors to Rolls-Royce Limited, Derby, England
Filed July 24, 1969, Ser. No. 844,420
Claims priority, application Great Britain, July 25, 1968, 35,456/68
Int. Cl. F02c 7/08
U.S. Cl. 60—39.52                              6 Claims

ABSTRACT OF THE DISCLOSURE

The invention comprises a gas turbine engine power plant having a rapid shutdown facility. The air inlet can be rapidly closed, and the exhaust gases are then diverted, cooled and recirculated through the engine to permit it to run down to rest without stalling.

---

This invention relates to gas turbine engine power plant for use in power generating installations.

It is sometimes desirable to shut off the external supply of air to such a power plant very rapidly, for example to protect the gas turbine engine or engines in the power plant from shock waves or contaminants. It is an object of the present invention to enable rapid shut-off of the external air supply to be achieved while permitting the gas turbine engine or engines to run down to rest without damage.

According to the present invention, therefore, a gas turbine engine power plant comprises at least one gas turbine engine, an air inlet connected to supply air to the gas turbine engine via an inlet duct, means for closing the air inlet and means for diverting at least a part of the exhaust gases from the gas turbine engine into the inlet duct when the air inlet is closed.

In a preferred embodiment of the invention, there is provided cooling means for cooling the diverted exhaust gases from the gas turbine engine before they enter the inlet duct.

The cooling means preferably comprises a container at least partially filled with water and at least one conduit arranged to discharge the diverted exhaust gases beneath the surface of the water.

The conduit is preferably arranged to discharge the diverted exhaust gases either beneath a perforated plate immersed in the water or in a perforated manifold immersed in the water.

The means for diverting the exhaust gases may comprise an exhaust duct connected to receive the exhaust gases from the gas turbine engine and to discharge them from an outlet, means adapted to close the outlet when the pressure of the exhaust gases in the exhaust duct falls below a predetermined value, the exhaust duct communicating with the conduit.

The gas turbine engine is preferably arranged to discharge its exhaust gases to drive a free power turbine, the means for diverting the exhaust gases being arranged downstream of the free power turbine.

Figure 1:
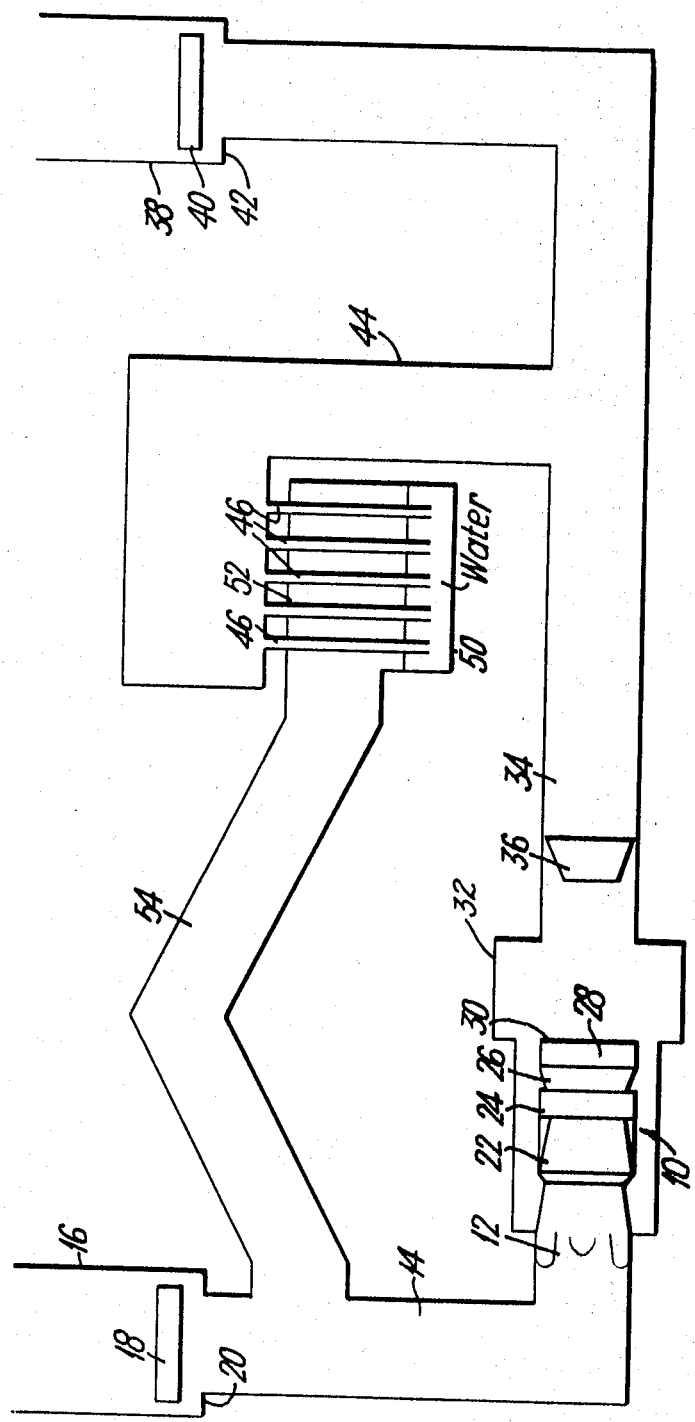
Figure 2:
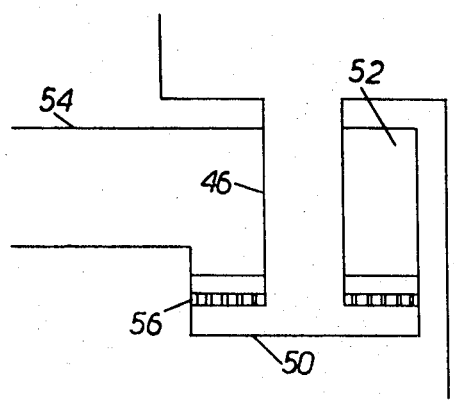
Figure 3:
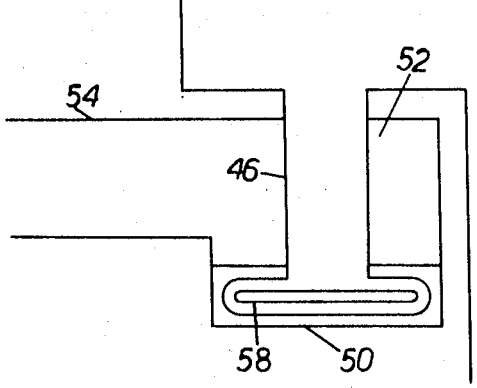

The invention will now be described, by way of non limitative example only, with reference to the accompanying drawings, of which:

FIG. 1 is a schematic drawing of a gas turbine engine power plant in accordance with the present invention; and FIGS. 2 and 3 are diagrammatic representations of alternative embodiments of a part of the power plant shown in FIG. 1.

Referring to FIG. 1, the gas turbine engine power plant comprises a gas turbine engine 10 having an air intake 12 connected via an inlet duct 14 to an air inlet 16. The air inlet 16 contains a plate valve 18 which is operated by means not shown and which co-operates with a seat 20.

The gas turbine engine 10 contains, in flow series, an axial flow compressor 22, combustion equipment 24, a compressor driving turbine 26, a jet pipe 28 and a discharge outlet 30. The discharge outlet 30 opens into a plenum chamber 32 which in turn communicates with an exhaust duct 34 containing a free power turbine 36. The free power turbine 36 is drivingly connected to a load (not shown) such as an electrical generator. The exhaust duct 34 communicates with an outlet 38 containing a weighted plate valve 40 which co-operates with a seat 42.

A conduit 44 communicates between a point in the exhaust duct 34 downstream of the turbine 36 and one end of each of a number of tubes 46 having whose other ends are open and immersed in water in a container 50. The part 52 of the container 50 above the water communicates, via an inverted V-shaped duct 54, with the inlet duct 14.

Alternative embodiments of the tubes 46 are shown in FIGS. 2 and 3. In FIG. 2, the open ends of the tubes 46 (only one of which is shown) are positioned beneath a perforated plate 56 which is completely immersed in the water, whilst in FIG. 3 the open ends of the tubes 46 (only one of which is shown) communicate with a perforated manifold 58 which is completely immersed in the water.

In normal operation the valves 18, 40 are open and atmospheric air is drawn into the air inlet 16 by the engine 10, which operates by burning fuel in the air in known manner. The exhaust gases from the engine 10 pass to the plenum chamber 32, whence they pass into the exhaust duct 34 so as to drive the turbine 36. The turbine 36 in turn drives the load. The exhaust gases from the turbine 36 are then discharged to atmosphere via the outlet 38. The head of water above the open ends of the tubes 46 in the container 50 is chosen to be sufficient to prevent gas flow in either direction through the duct 54 tubes 46 and conduit 44 during normal operation.

When it is desired to shut-off the external supply of air to the power plant, for example to exclude shock waves or contaminants, the plate valve 18 is urged onto the seat 20, thus closing the air inlet 16: the supply of fuel to the engine is simultaneously shut off. The gas pressure in the exhaust duct 34 falls rapidly, and when it reaches a predetermined value (e.g. just below its minimum normal working value) the plate valve 40 closes onto the seat 42, thus closing the outlet 38. The exhaust gases in the exhaust duct 34 are thus diverted into the conduit 44, whence they pass into the tubes 46.

The exhaust gases then bubble through the water in the container 50, thus being cooled. The violence of the bubbling, and thereforethe carry over of water in the exhaust gases, are reduced by the arrangements of the tubes 46 shown in FIGS. 2 and 3. The cooled exhaust gases pass into the duct 54, where any carried over water tends to be deposited and to run back into the container 50, and then pass into the inlet duct 14 to be recirculated through the engine 10.

Recirculation of the exhaust gases through the engine 10 continues as the engine runs down, thus cooling the engine and reducing the possibility of damage to the engine due to the severe stalling which might otherwise be caused when the external supply of air is shut-off.

It will be appreciated that the exhaust gases from the engine 10 may be diverted from a point upstream of the plenum chamber 32 and the turbine 36 if desired. However, where more than one gas turbine engine is connected to the plenum chamber 32, it is more economical (in terms of conduits) to divert the exhaust gases from a point downstream of at least the plenum chamber.

We claim:
1. A gas turbine engine power plant comprising
   at least one gas turbine engine,
   An inlet duct communicating with said at least one gas turbine engine for supplying air to the engine, said inlet duct having an air inlet and means for closing the air inlet,
   an exhaust duct connected to receive exhaust gases from said at least one gas turbine engine for discharging gases through an outlet of said exhaust duct,
   means for closing said outlet of said exhaust duct, and
   means for diverting at least a part of the exhaust gases from said at least one gas turbine engine into said inlet duct via a cooling means only when said air inlet is closed, thereby providing for a protective flow of gases through the engine when the air inlet is closed and the engine is running down.

2. A power plant as claimed in claim 1, wherein the cooling means comprises a container at least partially filled with water and at least one conduit arranged to discharge othe diverted exhaust gases beneath the surface of the water.

3. A power plant as claimed in claim 2, wherein a perforated plate is immersed in the water, the said one conduit being arranged to discharge the diverted exhaust gases beneath the perforated plate.

4. A power plant as claimed in claim 1, wherein a perforated manifold is immersed in the water, the said one conduit being arranged to discharge the diverted exhaust gases in the perforated manifold.

5. A power plant as claimed in claim 1 in which said means for closing the outlet of said exhaust duct functions to operate when the pressure of the exhaust gases in the exhaust duct falls below a predetermined value.

6. A power plant as claimed in claim 1, wherein the gas turbine engine is arranged to discharge its exhaust gases to drive a free power turbine, the means for diverting the exhaust gases being arranged downstream of the free power turbine.

References Cited

UNITED STATES PATENTS

| 873,785 | 12/1907 | Reichel | 60—30 L |
|---|---|---|---|
| 1,142,073 | 6/1915 | Wolff | 60—30 L |
| 1,529,351 | 3/1925 | Grooms | 60—30 L |
| 2,678,261 | 5/1954 | Ruth | 60—30 L X |
| 2,911,289 | 11/1959 | Forry | 60—30 L X |

FOREIGN PATENTS

| 6,317 | 3/1904 | Great Britain | 60—39.52 |
|---|---|---|---|
| 14,343 | 8/1908 | Great Britain | 60—30 L |
| 446,244 | 3/1949 | Italy | 60—39.52 |

BENJAMIN W. WYCHE, Primary Examiner

W. E. OLSEN, Assistant Examiner

U.S. Cl. X.R.

60—30 L